United States Patent
Ashoori et al.

(10) Patent No.: US 10,693,827 B2
(45) Date of Patent: *Jun. 23, 2020

(54) DETERMINING INTENDED ELECTRONIC MESSAGE RECIPIENTS VIA LINGUISTIC PROFILES

(71) Applicant: International Business Machines Corporation, Armonk, NY (US)

(72) Inventors: Maryam Ashoori, White Plains, NY (US); Justin David Weisz, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,949

(22) Filed: Oct. 29, 2018

(65) Prior Publication Data
US 2019/0068541 A1    Feb. 28, 2019

Related U.S. Application Data

(63) Continuation of application No. 14/954,992, filed on Nov. 30, 2015, now Pat. No. 10,171,403.

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |
| *G06F 40/253* | (2020.01) |
| *G06F 40/263* | (2020.01) |

(52) U.S. Cl.
CPC ............ *H04L 51/28* (2013.01); *G06F 40/253* (2020.01); *G06F 40/263* (2020.01); *H04L 51/18* (2013.01); *H04L 63/00* (2013.01); *H04L 63/04* (2013.01); *H04L 67/10* (2013.01); *H04L 67/306* (2013.01)

(58) Field of Classification Search
None
See application file for complete search history.

(56) References Cited

U.S. PATENT DOCUMENTS

| | | |
|---|---|---|
| 6,671,718 B1 | 12/2003 | Meister et al. |
| 7,499,976 B2 | 3/2009 | Cato |
| 7,627,635 B1 | 12/2009 | Logue |
| | (Continued) | |

OTHER PUBLICATIONS

Keila et al., "Detecting unusual email communication." Proceedings of the 2005 conference of the Centre for Advanced Studies on Collaborative research. IBM Press, 2005.

(Continued)

*Primary Examiner* — Mohamed Ibrahim
(74) *Attorney, Agent, or Firm* — Daniel P. Morris; McGinn IP Law Group, PLLC

(57) ABSTRACT

A method for checking against transmitting a message to an unintended recipient, includes developing, using a processor on a computer, a training model of a linguistic profile of messages previously transmitted electronically by a user to a recipient, by iteratively computing a composite feature vector over a set of all messages previously transmitted electronically to the recipient, the iterations for developing the training model continuing until summed proportional changes across all features falls below a first preset threshold value.

13 Claims, 4 Drawing Sheets

(56) References Cited

U.S. PATENT DOCUMENTS

| | | | |
|---|---|---|---|
| 8,452,880 B2* | 5/2013 | Jain | G06Q 10/107 |
| | | | 707/697 |
| 8,520,807 B1 | 8/2013 | Hewinson | |
| 8,924,497 B2* | 12/2014 | Sheridan | G06Q 10/107 |
| | | | 709/207 |
| 9,002,941 B2 | 4/2015 | Carrigan et al. | |
| 9,502,025 B2* | 11/2016 | Kennewick | G06F 40/40 |
| 2003/0233353 A1 | 12/2003 | Taylor | |
| 2004/0093428 A1 | 5/2004 | Arnold | |
| 2005/0138127 A1 | 6/2005 | Jain | |
| 2005/0240617 A1 | 10/2005 | Lund | |
| 2007/0106735 A1 | 5/2007 | Hardy, Jr. | |
| 2008/0168142 A1 | 7/2008 | Chung | |
| 2010/0179961 A1 | 7/2010 | Berry | |

OTHER PUBLICATIONS

Cohen et al. "Clarifying the linguistic signature: Measuring personality from natural speech." Journal of personality assessment 90.6 (2008): 559-563.

Pearl et al., "Can you read my mindprint?: Automatically identifying mental states from language text using deeper linguistic features." Interaction Studies 15.3 (2014): 359-387.

Kumar et al., "A study on implementations of guilt agent models & analysis." International Journal of Advanced Research and Innovations 1.1 (2012): 46-51.

Bartel et al., "Towards hierarchical email recipient prediction." Collaborative Computing: Networking, Applications and Worksharing (CollaborateCom), 2012 8th International Conference on. IEEE, 2012.

* cited by examiner

DETERMINING INTENDED ELECTRONIC MESSAGE RECIPIENTS VIA LINGUISTIC PROFILES

This Application is a Continuation Application of U.S. patent application Ser. No. 14/954,992, filed on Nov. 30, 2015.

BACKGROUND

The present invention relates to using stylometry in a practical application of assisting users to avoid accidentally sending electronic messages to incorrect recipients. More specifically, using a machine learning classifier, linguistic signatures detect and alert a user when a listed recipient is different from a recipient inferred from the content of the message.

SUMMARY

According to an embodiment of the present invention and in view of recent surge in popularity of various forms of electronic messaging, a software-implemented system provides an additional safeguard that authors of electronic messages do not mistakenly dispatch electronic messages to unintended recipients.

DETAILED DESCRIPTION

Figure 1:
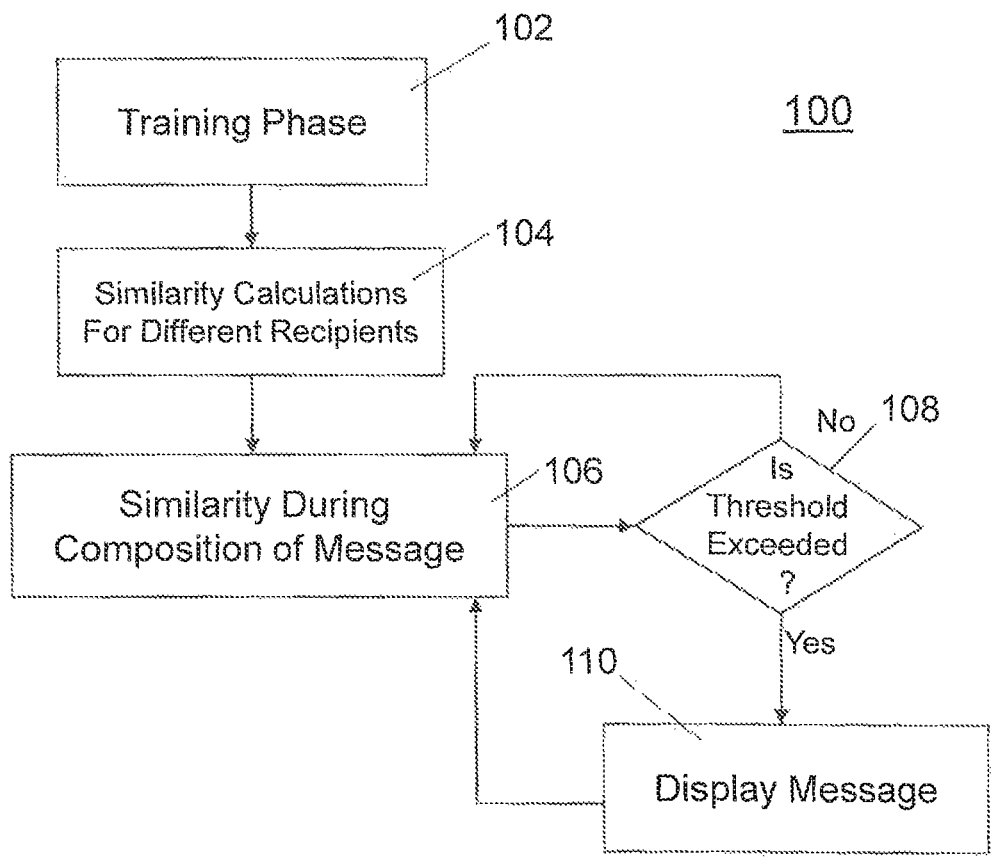
FIG. 1 shows an exemplary flowchart 100 of the method of the present invention.

With reference now to FIG. 1, a system is herein described for determining whether the listed recipient of an electronic message is a recipient actually intended to be receiving the message. The system uses linguistic signatures to detect and alert users when the listed recipient of a message is different from the recipient inferred from the content of the message.

For example, when writing a text message "i love you", if the listed recipient is someone you have not normally sent such a message to (e.g., your boss or one of your employees), the present invention system would alert you that the contents of the message do not match the contents of prior communications with that recipient.

Stylometry has been defined as a form of authorship recognition that relies on the linguistic information found in a document, although the same concepts have been further extended to music and fine-art paintings.

Therefore, in one sense, the present invention reverses the techniques of conventional stylometry by using differences in how one writes messages to different people, in order to validate that the listed recipient of a message is also the intended recipient. In other words, the present invention applies stylometric methods to specific communications between A-→B, rather than the evaluation of all messages written by A.

Thus, the present invention provides a practical application of stylometric methods by providing a system that is capable to identify which features make a message characteristic/uncharacteristic to a potential recipient. For example, the user might receive a warning message such as: "This message appears to be about patents, but you don't normally write emails to Joe about patents." Or, some embodiments might highlight individual words/phrases/tokens/n-grams present in the message that make the message uncharacteristic to the recipient, e.g. sending "i*love*you" to Jack when you don't normally use the word "love" in emails to Jack.

In one embodiment, the method could actually provide a display that recommends who among the listed recipients the message was actually intended for with a confidence level (e.g.: John, 70% confidence; Jane, 64% confidence; Joe, 20% confidence). Moreover, as exemplarily applied to email, the invention could be extended to the content of email attachments as well as the body of email text.

The present invention uses machine learning classifier to determine if the current message M is characteristic for any one given recipient, and the invention can be extended to consider multiple listed recipients. Linguistic profiles may be represented as feature vectors that include word-level features (unigrams/bigrams/n-grams, punctuation), dictionary features (e.g. emoticon dictionaries, LIWC psycholinguistic categories, General Inquirer categories, WordNet categories), and/or topic features (e.g. features generated by LDA). Similarity( ) is a distance function between two feature vectors; e.g. cosine similarity.

Possible types of electronic message areas may include, as non-limiting examples, emails, text messages, and instant messages. The invention may be embodied on mobile devices, wearables, or computers, or even as a cloud service. In some embodiments, a threshold may be user-defined.

As shown in step 102 in FIG. 1, a training phase is necessary to construct an accurate linguistic profile $P\_\{U, R\_i\}$; this process consists of iterating over the set of messages $M\_\{U,R\_i\}$ sent from U to $R\_i$ and computing the feature vector until the summed proportional changes across all features falls below some threshold, meaning that the training model keeps training until the addition of a new message does not add significant new information to the profile. This may be done using techniques from Information Theory (e.g., computing information gain across each subsequent training step, which is well known in the art.

As shown in step 102, a machine learning classifier determines if a current message M is characteristic for the given recipient and if not, can recommend who the message was actually intended for with a confidence level (e.g. John, 70% confidence; Jane, 64% confidence). In a similar manner, this could even be extended to multiple recipients by adding a component that probabilistically recommends people who might/should be added to or removed from the recipient group.

Linguistic profiles may be represented as feature vectors that include word-level features (unigrams/bigrams/n-grams, punctuation), dictionary features (e.g. emoticon dictionaries, LIWC psycholinguistic categories, General Inquirer categories, WordNet categories), and/or topic features (e.g. features generated by LDA). Similarity® is a distance function between two feature vectors and can be calculated using any of various known methods such as cosine similarity, Pearson's correlation coefficient, Jaccard similarity, etc.

Thus, as shown in step 104, for a user U and a set of message recipients $R=\{R\_1, R\_2, R\_N\}$, the Profile Unit (PU) computes a linguistic profile $P\_\{U,R\_i\}$ between U and each recipient $R\_i$.

While composing an electronic message M to a recipient R_r, in step 106, the Similarity Unit (SU) computes the similarity of the message with the linguistic profile, $S\_\{M, U, R\_r\}$=Similarity $(M, P\_\{U, R\_r\})$.

In step 108, if $S\_\{M,U,R\_r\}$ falls below some threshold (e.g. 0.7), the user U is alerted in step 110 that the listed recipient R_r may not be their intended recipient.

A number of further variations and modifications are possible. For example, when a message M is being composed that is not identified as being addressed to anyone, the present invention can recommend to whom to address it, by comparing the features extracted from M with the profiles of past email recipients, sorting by similarity, and recommending the top-N recommended recipients. For example, the application could present a display on a user interface to the composer along the lines of "Here are recommended recipients: John (80%), Jane (74%)."

As another exemplary but non-limiting modification, when composing message M that is addressed to, for example, Jacquelyn, but the similarity between M and Jacquelyn's profile is low, the present invention could a. Perform a phonetic match of Jacquelyn's name against the list of previous message recipients to create a shortlist of possible recipient candidates, and b. Sort the short list by M's similarity-to-profile for each candidate on the shortlist, in order to recommend recipients who may have been the true intended recipient.

For example, a message addressed to Jacquelyn might have low similarity to previous messages addressed to Jacquelyn, but high similarity to messages written in the past to Jack. Since "Jacquelyn" and "Jack" are similar phonetically, the present invention could recommend "did you mean to address this message to Jack instead of Jacquelyn?". This modification could also help in cases where there are multiple people with the same name, e.g., a message addressed to "Mark Smith" but intended for "Mark Daniels" might show as having low similarity to Mark Smith and high similarity for Mark Daniels. The phonetic matching helps reduce the search space of names to recommend.

From the above explanation and examples, it should be clear that the methods and variations of the present invention could be implemented as a module or component in any number of applications such as email and other social media, word processors, and even as a potential service available from a server or as a cloud service. Accordingly, it should be clear that many types of hardware might be used to execute a software-based tool that implements the concepts of the present invention, including mobile communication devices. Most realistic devices that implement the present invention would reasonably incorporate at least one processor and associated memory system, but it should be clear that the present invention could be implemented in a device that merely interfaces to display results from a remote computerized device that actually performs the processings described above. Thus, the following exemplary description of possible hardware implementation is directed toward the more complex hardware embodiment using a cloud service scenario, but one of ordinary skill in the art would readily realize that many other hardware implementations are possible.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
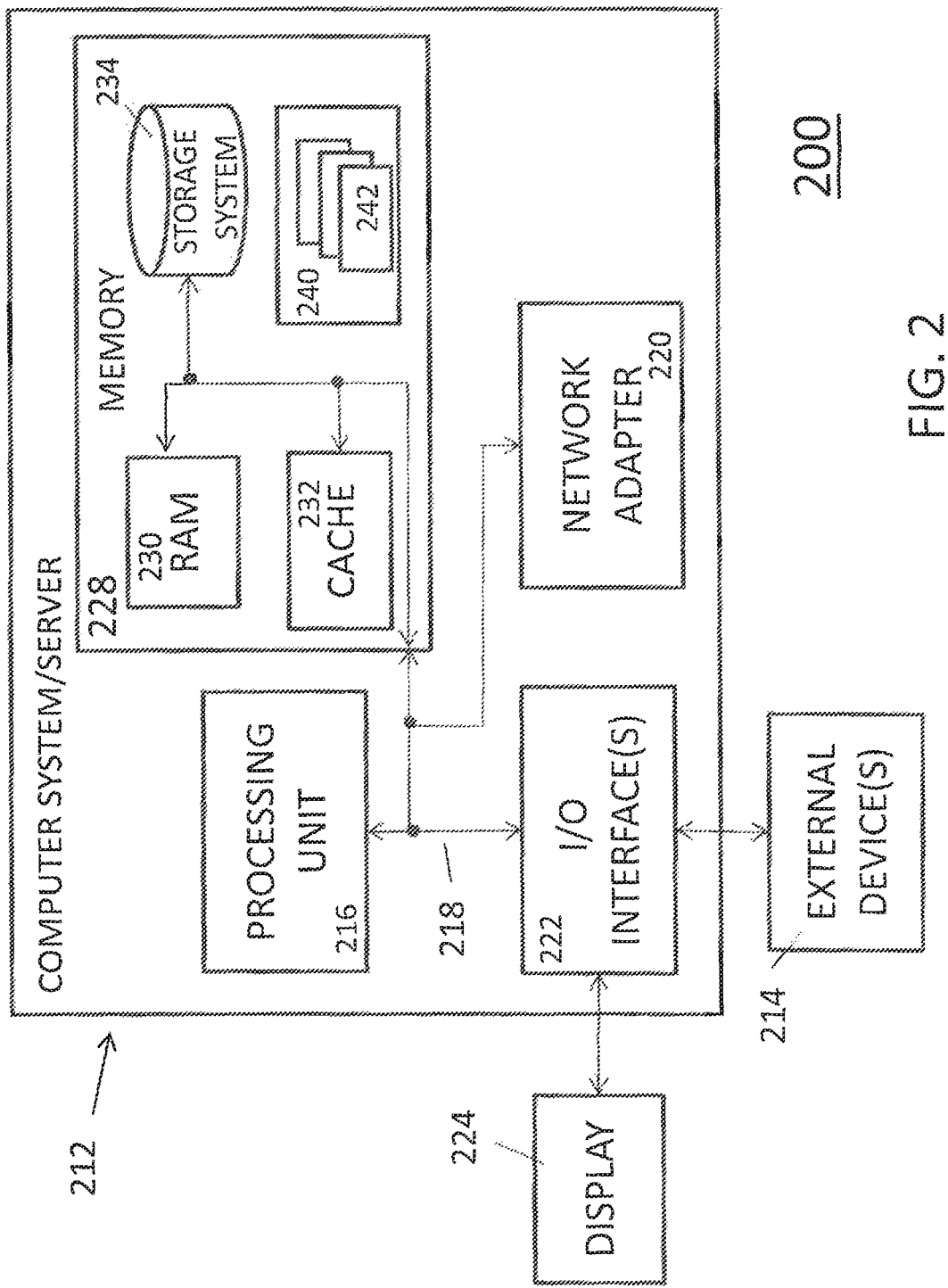
FIG. 2 depicts a cloud computing node 200 according to an exemplary embodiment of the present invention.

Referring now to FIG. 2, a schematic 200 of an example of a cloud computing node is shown. Cloud computing node 200 is only one example of a suitable cloud computing node and is not intended to suggest any limitation as to the scope of use or functionality of embodiments of the invention described herein. Regardless, cloud computing node 200 is capable of being implemented and/or performing any of the functionality set forth hereinabove.

In cloud computing node 200 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 212 in cloud computing node 200 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Figure 3:
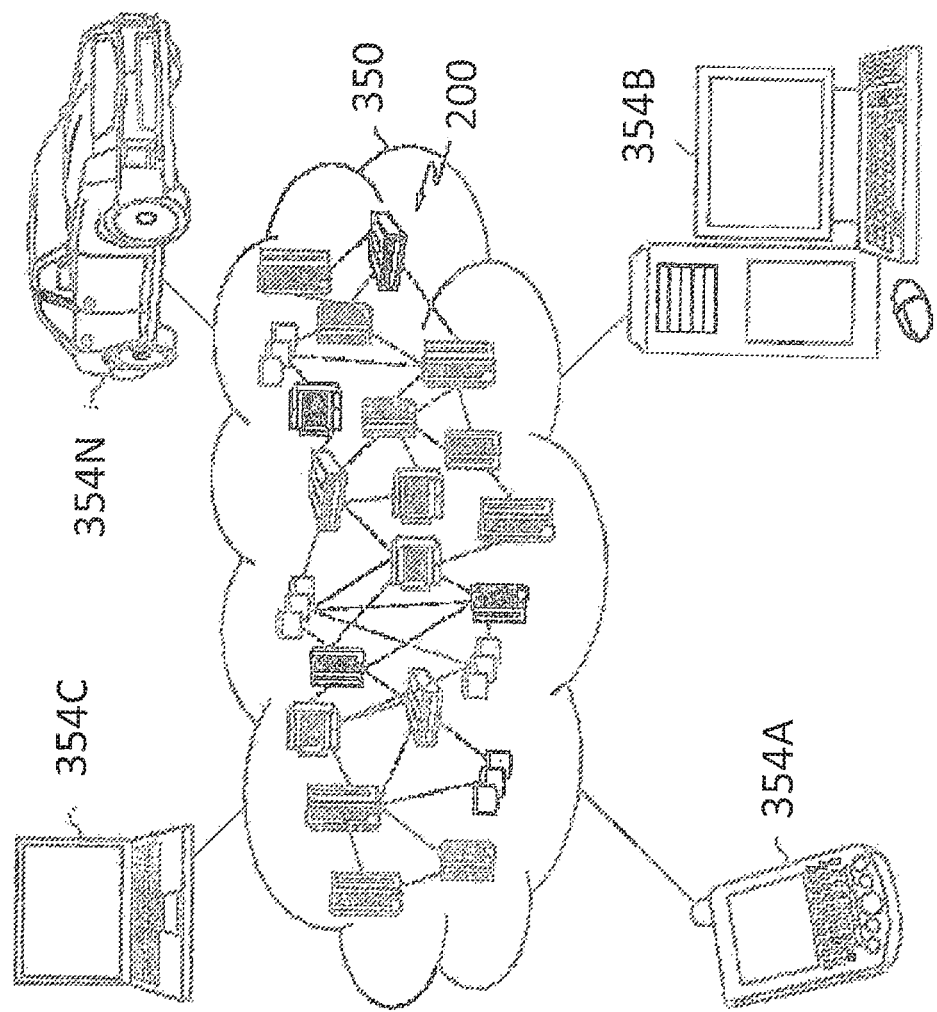
FIG. 3 depicts a cloud computing environment 300 according to an exemplary embodiment of the present invention.

Referring now to FIG. 3, an illustrative cloud computing environment 350 is depicted. As shown, cloud computing environment 350 comprises one or more cloud computing nodes 200 with which local computing devices used by cloud consumers, such as, for example, personal digital assistant (PDA) or cellular telephone 354A, desktop computer 354B, laptop computer 354C, and/or automobile computer system 354N may communicate. Nodes 200 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 200 and cloud computing environment 350 can communicate with any type of computerized device over any type of network and/or network addressable connection (e.g., using a web browser).

Figure 4:
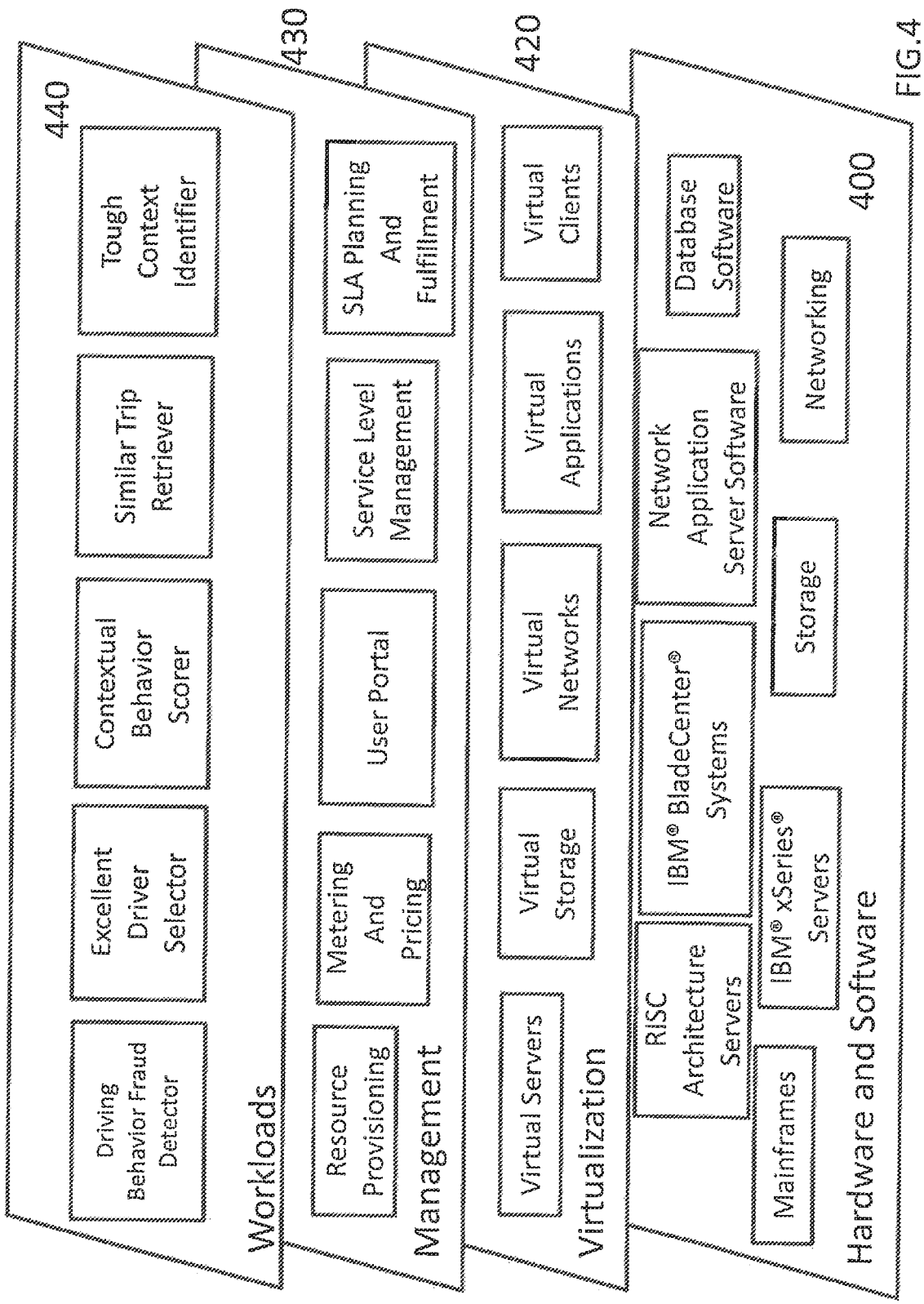
FIG. 4 depicts abstraction model layers 400-440 according to an exemplary embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 400.

Virtualization layer 420 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 420.

In one example, management layer 430 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 440 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, the stylometric processing shown in FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for checking against transmitting a message to an unintended recipient, said method comprising: developing, using a processor on a computer, a training model of a linguistic profile of messages previously transmitted electronically by a user to a recipient, by iteratively computing a composite feature vector over a set of all messages previously transmitted electronically to the recipient, the iterations for developing the training model continuing until summed proportional changes across all features falls below a first preset threshold value; storing the training model in a database accessible by the processor; developing a linguistic profile of a new message being prepared by the user to be transmitted to the recipient as an intended recipient of the message, as the new message is being composed by the user, the linguistic profile comprising feature vectors including one or more of word-level features, dictionary features, and topic features; retrieving the training model from the database; comparing the linguistic profile of the new message with the training model; calculating a confidence level as to whether the new message being composed is actually intended to be transmitted to the intended recipient, based on the comparing of linguistic profile with the linguistic profile of the training model and using a classifier associated with the developed training model; and displaying a message if the calculated confidence level is below a second preset threshold value.

2. The method of claim 1, further comprising: developing a separate training model for the user for each person to whom the user has sent messages by similarly iteratively computing a composite feature vector over a set of all messages sent to each person; and storing the developed training models in the database.

3. The method of claim 1, wherein the method is implemented on a system having a plurality of users, the method further comprising, for each user of the plurality of users of the system: developing and maintaining in a database training models of linguistic profiles for each user of the plurality of users, each user having a separate training model for each person to whom the user has transmitted one or more messages, each training model comprising a composite feature vector over a set of all messages transmitted electronically by the user to another person being a recipient; storing each developed training model in the database; and retrieving an appropriate training model from the database for comparison with a new message being composed by any user of the plurality of users.

4. The method of claim 1, as embodied in a set of computer-readable instructions tangibly embodied on a non-transitory storage medium.

5. The method of claim 1, wherein said non-transitory storage medium comprises one of: a memory device on a computer, said memory device storing programs that can selectively be executed by a processor on said computer or that can selectively be downloaded by said processor from said computer onto another computer connected via a network; a memory device on said computer storing programs that are currently being executed by said processor; and a standalone storage device that can be inserted into an input port of said computer and uploaded onto a memory device on said computer.

6. The method of claim 1, as embodied as a component in an application program in which messages can be composed by a user and transmitted.

7. The method of claim 1, as embodied in one of: a service available on a server in a network; and a cloud service.

8. An apparatus, comprising: a processor; and at least one memory system accessible to said processor, wherein one of said at least one memory stores a set of computer-readable instructions which permit said processor to execute a method comprising: developing a training model, using a processor on a computer, of a l inguistic profile of messages previously transmitted electronically by a user to a recipient, by iteratively computing a composite feature vector over a set of all messages previously transmitted to the intended recipient, the iterations for developing the training model continuing until summed proportional changes across all features falls below a first preset threshold value; storing the training model in a storage device accessible to the processor; developing a linguistic profile of a new message being prepared by the user to be transmitted to the recipient as an intended recipient of the message being prepared as the message is being composed by a user, the linguistic profile comprising feature vectors including one or more of word-level features, dictionary features, and topic features; comparing said linguistic profile of the new message with the training model; calculating a confidence level as to whether the new message being composed is actually intended to be transmitted to the intended recipient, based on the comparing of linguistic profile with the linguistic profile of the training model; displaying a message if said confidence level is below a second preset threshold value.

9. The apparatus of claim 8, wherein said storage device comprises a database for storing training models developed for the user, the database having a training model of a linguistic profile for the user for each of other persons to whom the user has transmitted messages.

10. The apparatus of claim 9, as comprising a mobile device of the user.

11. The apparatus of claim 9, wherein the database is controlled by one of: a server on a network; and a server on a network that is providing a cloud service to users.

12. A non-transitory storage medium tangibly embodying a set of computer-readable instructions that permit a processor on a computing device to execute a method, said method comprising: receiving inputs from a user as composing a new message to be transmitted to an intended recipient; retrieving from a database accessible by the computing device a training model of a linguistic profile of messages previously transmitted electronically by the user to the intended recipient, the training model having been developed by iteratively computing a composite feature vector over a set of all messages previously transmitted to the intended recipient, the iterations for developing the training model continuing until summed proportional changes across all features falls below a first preset threshold value, the developed training model being stored in the database accessible to the processor; developing a linguistic profile of the new message to be transmitted, using a processor on the computing device, as the new message is being prepared, the linguistic profile comprising feature vectors including one or more of word-level features, dictionary features, and topic features; comparing the linguistic profile of the new message with the training model for the user for the intended recipient; calculating a confidence level as to whether the new message being composed is actually intended to be transmitted to the intended recipient, based on the comparing of linguistic profile with the linguistic profile of the training model for the user for the intended recipient; displaying a message if the confidence level is below a second preset threshold value.

13. The non-transitory storage medium of claim 12, said method further comprising developing and maintaining in a memory accessible by the computing device a database for the user comprising separate training models for each person the user has previously transmitted one or more messages.

* * * * *